(12) United States Patent
Machnicki et al.

(10) Patent No.: US 8,806,245 B2
(45) Date of Patent: Aug. 12, 2014

(54) MEMORY READ TIMING MARGIN ADJUSTMENT FOR A PLURALITY OF MEMORY ARRAYS ACCORDING TO PREDEFINED DELAY TABLES

(75) Inventors: Erik P. Machnicki, San Jose, CA (US); Michael Frank, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 244 days.

(21) Appl. No.: 12/939,607

(22) Filed: Nov. 4, 2010

(65) Prior Publication Data

US 2012/0117402 A1    May 10, 2012

(51) Int. Cl.
*G06F 1/00* (2006.01)
*G06F 12/00* (2006.01)

(52) U.S. Cl.
USPC .......................................... 713/322; 711/156

(58) Field of Classification Search
USPC .................. 713/322, 324, 340, 156; 711/156
See application file for complete search history.

(56) References Cited

U.S. PATENT DOCUMENTS

| | | | |
|---|---|---|---|
| 5,657,476 A * | 8/1997 | O'Connell et al. ............ | 711/166 |
| 6,198,679 B1 * | 3/2001 | Nakasu et al. ............ | 365/189.18 |
| 6,807,101 B2 | 10/2004 | Ooishi et al. | |
| 6,915,443 B2 * | 7/2005 | McBride et al. .............. | 713/503 |
| 6,999,354 B2 | 2/2006 | Aitken et al. | |
| 7,114,118 B1 | 9/2006 | Shubat | |
| 7,688,656 B2 | 3/2010 | Zhang et al. | |
| 2002/0013881 A1 * | 1/2002 | Delp et al. ..................... | 711/105 |
| 2004/0202039 A1 * | 10/2004 | Takayanagi ................... | 365/233 |
| 2004/0218430 A1 * | 11/2004 | Nishioka ....................... | 365/194 |
| 2005/0036400 A1 * | 2/2005 | Chen ............................. | 365/233 |
| 2005/0180228 A1 * | 8/2005 | Canada et al. ................ | 365/194 |
| 2007/0174642 A1 * | 7/2007 | Cornwell et al. ............. | 713/300 |
| 2008/0181032 A1 * | 7/2008 | Yu et al. ........................ | 365/194 |
| 2009/0235171 A1 | 9/2009 | Adams et al. | |
| 2009/0256611 A1 * | 10/2009 | Takahashi ..................... | 327/270 |
| 2010/0138684 A1 * | 6/2010 | Kim et al. ..................... | 713/601 |

OTHER PUBLICATIONS

"Setup the Debugger for a CoreSight System," Aug. 11, 2010, 27 pages.

* cited by examiner

*Primary Examiner* — Thomas Lee
*Assistant Examiner* — Phil Nguyen
(74) *Attorney, Agent, or Firm* — Lawrence J. Merkel; Erik A. Heter; Meyertons, Hood, Kivlin, Kowert & Goetzel, P.C.

(57) ABSTRACT

An apparatus and method for changing the extra margin adjustment (EMA) for a memory is disclosed. A control unit may access a table responsive to an indication of a change of operating point. The table includes a number of different delay times, each of which corresponds to a particular operating point. The control unit may select the delay time that corresponds to the new operating point to which the memory operation is being changed. The control unit may further convey an indication of the selected delay time to the memory, thereby causing the memory to operate according thereto.

19 Claims, 5 Drawing Sheets

MEMORY READ TIMING MARGIN ADJUSTMENT FOR A PLURALITY OF MEMORY ARRAYS ACCORDING TO PREDEFINED DELAY TABLES

BACKGROUND

1. Field of the Invention

This invention relates to electronic circuits, and more particularly, to the timing of memory circuits.

2. Description of the Related Art

In recent years, many integrated circuits (ICs) have been designed to include a number of power-saving features. For example, many IC's nowadays include circuitry coupled to receive an adjustable supply voltage. In times of increased performance demand, the supply voltage may be increased to support the desired performance level. In times of reduced performance demand, the supply voltage may be reduced in order to save power.

Changing the supply voltage may result in changes to the operational characteristics of that circuitry. One type of circuitry that may be affected by a changing supply voltage is on-chip memory circuitry. At higher supply voltages, certain types of memory circuitry may require less time to perform read operations. Conversely, when operating at lower supply voltages, additional time may be required to perform a read operation. In particular, the time to perform a read operation may be related to the time required for sense amplifiers in the memory to accurately reflect the stored data values in selected memory cells. Accordingly, IC's that include one or more on-chip memories may include additional circuitry that allows a sufficient amount of time to elapse from the beginning of a read cycle to the time that corresponding sense amplifiers may provide valid data. Such circuitry may need to be programmed to set an appropriate delay for a given operating point.

SUMMARY

An apparatus and method for changing the extra margin adjustment (EMA) for a memory is disclosed. EMA (hereinafter 'delay time') as used herein refers to a delay associated with a memory access cycle. During a read cycle, the delay may occur between the beginning of a memory read cycle and a subsequent time when output pins of the memory are capable of providing valid data. During a write cycle, the delay may occur between the time write drivers drive data onto bit lines and the time that a word line associated with a target write address is asserted. In one embodiment, a control unit may access a table responsive to an indication of a change of operating point. The table includes a number of different delay times, each of which corresponds to a particular operating point. The control unit may select the delay time that corresponds to the new operating point to which the memory operation is being changed. The control unit may further convey an indication of the selected delay time to the memory, thereby causing the memory to operate according thereto.

In one embodiment, an operating point includes at least one of a supply voltage and a clock frequency. The supply voltage is that which is used to power the memory during operation. The clock frequency refers to a frequency of a clock signal provided to the memory in order to synchronize its operation. One or both of the supply voltage and the clock frequency may be increased to support higher performance. Conversely, one or both of the supply voltage and the clock frequency may be reduced for power saving purposes. These changes may necessitate a corresponding change in the delay time. Increases in the supply voltage and/or clock frequency may enable the delay time to be reduced to support the higher performance level. When the supply voltage and/or clock frequency is reduced, additional time may be required for the memory to output valid data. Accordingly, the delay time may be increased when the supply voltage and/or clock frequency is reduced.

The direction of change may affect the order in which certain operations are performed. In one embodiment, if the supply voltage and/or clock frequency is reduced, the delay time may be increased prior to the change. On the other hand, if the supply voltage and/or clock frequency is increased, the delay time may be reduced subsequent to the change.

Embodiments of an IC including two or more on-die memories are also possible and contemplated. Such embodiments may include multiple tables as described above, as different memories may require different delays for the same operating point. Accordingly, when a change of operating point is indicated to the control unit, both tables may be accessed to determine the delay times for their respective memories.

A method for setting the delay time of a memory includes a control unit receiving an indication of an operating point change and accessing a table storing delay time values responsive thereto. Each of the delay time values stored in the table corresponds to one of a plurality of operating points. The control unit may select the delay time value from the table that corresponds to the operating point to which the memory operation is being changed. After the selection has been made, the control unit may forward the delay time value to the memory. The new delay time may be set by the memory responsive to its receipt therein. The change of the delay time may occur prior to the change of operating point or subsequent to the change of operating point, depending on the direction of change of the operating point.

BRIEF DESCRIPTION OF THE DRAWINGS

The following detailed description makes reference to the accompanying drawings, which are now briefly described.

Figure 1:
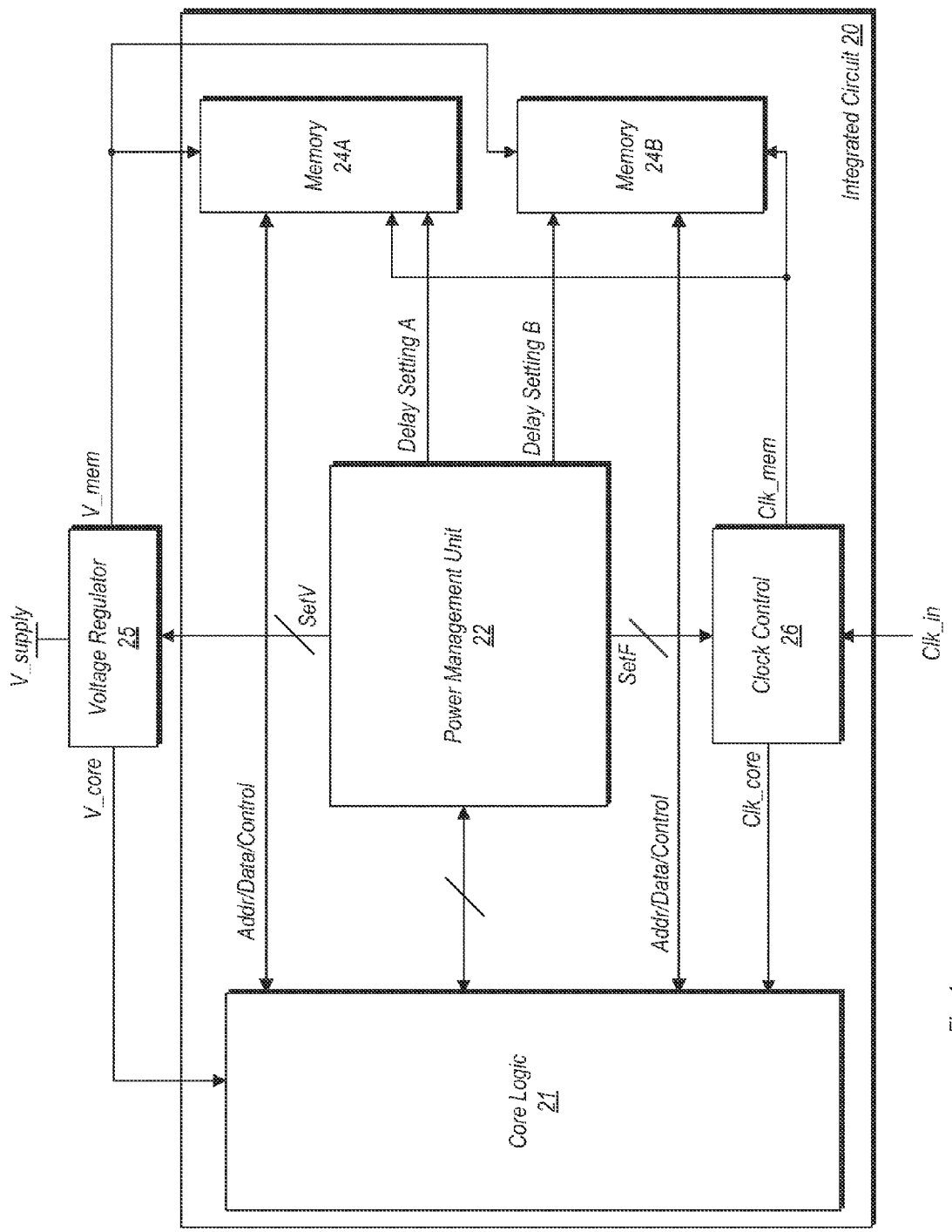
FIG. 1 is a block diagram of one embodiment of an integrated circuit (IC).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Integrated Circuit:

Turning now to FIG. 1, a block diagram of one embodiment of an integrated circuit (IC) is shown. In the embodiment shown, IC 20 includes a core logic unit 21, a power management unit 22, a pair of memories 24A and 24B, and a clock control unit 26. In the embodiment shown, IC 20 is coupled to receive power from voltage regulator 25, and may provide control signals to adjust the provided voltage. It is noted that IC 20 as shown here is exemplary, and thus other configurations are possible and contemplated. For example, embodiments of an IC having multiple instances of core logic unit 21 are possible, wherein at least one of the multiple instances of the core logic may be different from at least one other instance. Embodiments having multiple, identical instances of core logic unit 21 are also possible. In general, a wide variety of arrangements of an IC may fall within the scope of the following discussion. It is further noted that various ones of the components of IC 20 may, in other embodiments, be located on different IC dies. Furthermore, voltage regulator 25 may be implemented on IC die 20 in some embodiments.

Core logic unit 21 is configured to perform the primary functions of IC 20. In one embodiment, core logic unit 21 is a processor core configured to execute instructions. Core logic unit 21 may implement a RISC (reduced instruction set computing) processor or a CISC (complex instruction set computing) processor, or a hybrid thereof. As such, core logic unit 21 may include various components such as register files, execution units, prefetchers, and so forth.

IC 20 may be implemented in one of a wide variety of systems, including mobile systems (e.g., cell phones/smart phones, mobile computers, etc.). Accordingly, IC 20 may include a power management unit 22 configured to control and manage its power consumption according to operational requirements. Power management unit 20 in the embodiment shown may thus function as a control unit that controls an operating point of IC 20. An operating point as used herein refers to one or both of a supply voltage and a frequency of a clock signal provided to various ones of the components. Accordingly, changing an operating point as used herein refers to changing at least the supply voltage and may also include frequency of the clock signal received by various components.

Power management unit 22 in the embodiment shown is configured to change the operating point responsive to changes in the workload IC 20. If the processing workload increases, the operating point may be changed to increase the supply voltage, the clock frequency, or both. Similarly, if the workload decreases, the operating point may be changed by reducing the supply voltage and/or reducing the clock frequency. Power management unit 22 as shown herein may monitor the workload of core logic unit 21 in order to determine the appropriate operating point. Alternatively, core logic unit 21 may perform self-monitoring of its workload, and may convey requests to change the operating point to power management unit 22. In another embodiment, software executing on IC 20 may request operating point changes, in addition to or instead of the above hardware monitor.

To effect a change of operating point, power management unit 22 may send signals to voltage regulator 25 and/or clock control unit 26. More particularly, power management 22 may effect a change of the supply voltage by sending one or more signals ('SetV') to voltage regulator 25. Similarly, power management unit 22 may effect a change of one or more clock signal frequencies by sending one or more signals ('SetF') to clock control unit 26. In some cases, two different operating points may have a common clock frequency, and thus switching between such operating points is accomplished by changing the operating voltage of particular components of IC 20 Embodiments are also possible and contemplated where one of either the clock frequency or operating voltage remains constant for all operating points. In the former, an operating point change occurs when the operating voltage is changed, in the latter an operating point change occurs when the clock frequency is changed.

Voltage regulator 25 in the embodiment shown may be coupled to receive a supply voltage, V_supply from a power source external to IC 20. In turn, voltage regulator 25 may provide operating voltages to core logic unit 21 ('V_core') and to each of memories 24A and 24B ('V_mem'). For example, voltage regulator 25 may be, in one embodiment, configured to receive a supply voltage of 5 Volts and to provide operating voltages to core logic unit 21 and memories 24A and 24B of 3.3. Volts and lower.

It is noted voltage regulator 25 may be configured to provide different voltages for V_core and V_mem in some embodiments, and that this difference may in some cases be different for a respective operating point. However, embodiments where V_core and V_mem are provided at the same value for a given operating point are also possible. It is further noted that embodiments are possible and contemplated wherein memory 24A is powered independently of memory 24B, and thus these memories may at times operate according to different voltages received from voltage regulator 25.

As noted above, voltage regulator 25 is configured to provide V_core and V_mem at certain levels according to the SetV signals received from power management unit 22. For each component coupled to receive a voltage from voltage regulator 25, one or more signals may be provided on the signal path labeled SetV. The signals may indicate the level of the voltages to be provided to their corresponding components, and thus their states may change when power management unit 22 provides new values. It is noted that power management unit 22 and voltage regulator 25 may be configured such that voltages to various components may be changed independently of one another. For example, the voltage provided to core logic unit 21 from voltage regulator 25 in the embodiment shown may be changed without changing that which is provided to memories 24A and 24B.

Clock control unit 26 in the embodiment shown is coupled to receive an input clock signal from an external source on the Clk_in input, and may independently produce clock signals that are provided to core logic unit 21 ('Clk_core') and memories 24A and 24B ('Clk_mem'). The respective frequencies of the clock signals provided by clock control unit 26 may be variable and thus may be increased or decreased with corresponding operating point changes. The frequencies of the provided clock signals may be greater than or less than the input clock signal received on the Clk_in input. Furthermore, the frequencies of the various clock signals may be adjusted independently of one another.

Clock control unit 26 may be implemented using various types of circuitry. In one embodiment, clock control unit 26 may include a corresponding phase locked loop (PLL) for each of the clock signals to be generated. In another embodiment, a single PLL may be implemented, with the output coupled to clock multiplier and/or clock divider circuitry in order to generate the various clock signals. Embodiments utilizing one or more delay locked loops (DLLs) are also possible and contemplated. In general, any suitable type of clock generation/multiplication/division circuitry may be used to implement clock control unit 26 in order to produce the various clock signals that are provided to the components of IC 20.

As noted above, IC 20 includes memories 24A and 24B. These memories may be identical in some respects (e.g., type of circuitry used to implement) and different in other respects (e.g., capacity, function, etc.). The specific number of memories on a given embodiment of IC 20 may also vary, from as few as one, or in numbers greater than explicitly shown here. Furthermore, while memories 24A and 24B as shown herein share a common operating voltage and clock signal, it is noted that embodiments where operating voltages and clock signals are provided to each memory independently of others are possible and contemplated. Memories 24A and 24B may be used to provide storage for core logic unit 21, which may access data and/or instructions therefrom. Core logic unit 21 may also write information to memories 24A and 24B. Accordingly, each of memories 24A and 24B is coupled to receive address and control signals (e.g., read enables, write enables) from core logic unit 21. A bidirectional data path also coupled each of memories 24A and 24B to core logic unit 21. Memories 24A and 24B may each be implemented using one of a number of different memory technologies (e.g., static random access memory, or SRAM). Furthermore, memory 24A need not be the same memory technology as memory 24B.

Changes in the operating voltage to memories 24A and 24B may affect their operation. For example, at lower operating voltages, read operations may require more time to complete than when conducted at higher operating voltages and higher clock frequencies. More particularly, at lower voltages, more time may be necessary for sufficient strength to develop on the bit lines, whereas less time may be required at higher voltages. Thus, read operations may be characterized by a delay time between the beginning of a read cycle (e.g., when word lines are asserted) and when valid data may appear on the output pins. This delay may sometimes be referred to as read margin, or EMA as previously discussed. In the embodiment shown, power management unit 22 is configured to provide respective delay settings (Delay Setting A', 'Delay Setting B') to each of memories 24A and 24B responsive to operating point changes. As will be discussed in further detail below, each of memories 24A and 24B may include circuitry for setting the requested delay value responsive to the indicated settings received from power management unit 22. The delay values may be reduced responsive to an increase in one or more of the operating voltage and clock frequency. Conversely, when either (or both) the operating voltage or clock frequency is reduced, the delay values may be increased responsive thereto.

As will be discussed below, power management unit 22 may include one or more tables storing various delay settings (or delay values), each of which corresponds to a particular operating point. Accordingly, when changing from one operating point to another, power management unit 22 may access the tables to determine the appropriate delay settings for the new operating point. These settings may be conveyed to corresponding ones of memories 24A and 24B, each of which includes circuitry for setting respective delays. An exemplary embodiment of a memory will now be discussed in further detail.

Figure 2:
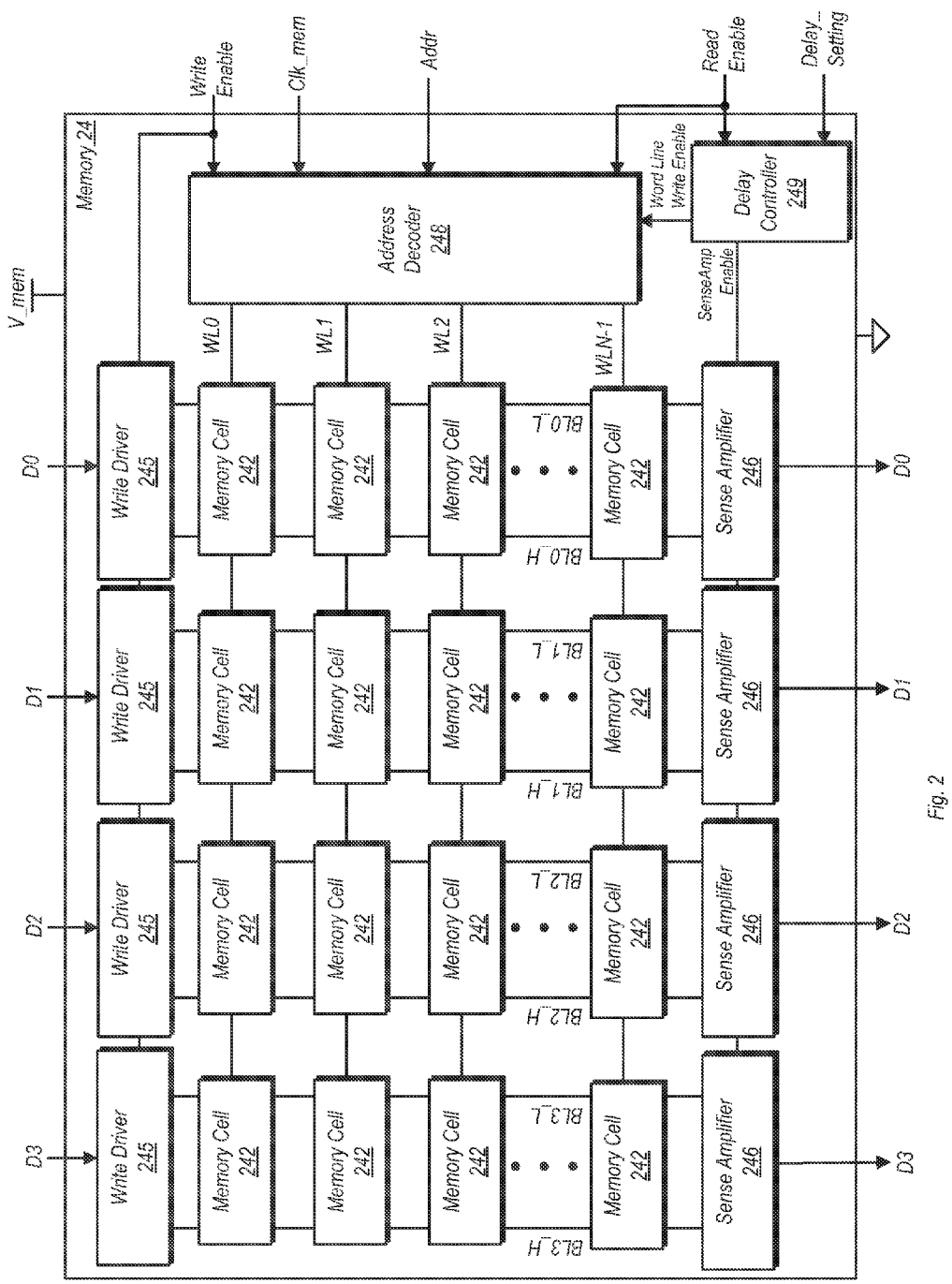
FIG. 2 is a block diagram of one embodiment of a memory.

Exemplary Memory:

FIG. 2 is a block diagram of one embodiment of a memory 24. More particularly, memory 24 in the embodiment shown may correspond to one or both of memories 24A and 24B shown in FIG. 1. In this embodiment, memory 24 is arranged to store N words of four bits each. This arrangement is realized by implementing N rows of memory cells 242 in four columns. It is noted that the number of bits per word is exemplary and is thus not intended to be limiting.

Each memory cell 242 for a given row is coupled to a corresponding word line, e.g., WL0, WL1, etc. The word lines are each coupled to address decoder 248, which is coupled to receive an address from an external source (e.g., core logic unit 21 of FIG. 1). Address decoder 248 may decode the received address and assert a logic level a corresponding word line during a read or write operation. When a word line is asserted, the memory cells 242 coupled thereto may be transparent to their respective bit lines and may thus enable a read or write operation to take place. Receipt of control signals (e.g., read enables, write enables) to memory 24 may be synchronized by a clock signal ('Clk_mem') received by address decoder 248. It is noted that the clock signal may be a non-periodic strobe signal.

In the embodiment shown, each memory cell 242 of a given column is coupled to two complementary bit lines (e.g., BL0_H and BL0_L in the column associated with D0). During read and write operations, one of the bit lines may convey the true value stored or to be stored in a memory cell 242, while the other bit line may convey a complementary value. Although not explicitly shown here for the sake of simplicity, some embodiments may include precharge circuitry coupled to each of the bit lines. The precharge circuitry may precharge the bit lines to the current operating voltage of the memory during a precharge phase. In one embodiment, the precharge circuitry may be implemented as PMOS (p-channel metal oxide semiconductor) transistors coupled between corresponding bit lines and the operating voltage node of the given memory. Gate terminals of the PMOS transistors may be coupled to receive the clock signal, and may thus be active when the clock signal is low. When the clock signal is high, the PMOS transistors may be deactivated, and thus true and complementary data may be conveyed on bit line pairs.

To perform a write operation in memory 24, data may be received on incoming data lines D3-D0 by respective write line drivers 245. The write line drivers may be enabled when a signal is asserted on the write enable input to memory 24. Address decoder 248 may assert a word line associated with the received address. The assertion of word lines in the embodiment shown may be determine in part by the assertion of a word line write enable (Word Line Write Enable) signal received by address decoder 248. In the embodiment shown, the word line write enable signal may be asserted at a delay time subsequent to assertion of the write enable signal, thereby allowing time for the write line drivers to drive each bit line of the bit line pairs to levels corresponding to the data received on inputs D3-D0 (with one bit line of a given pair falling low while the other bit line is high). When the word line is asserted, each of memory cells 242 coupled thereto is transparent to its respectively coupled bit lines. Data received by write drivers 245 may then be driven into the memory cells 245 of the selected address. The write operation may complete when either the write enable signal is de-asserted (thereby disabling write drivers 245) or when the clock signal falls low again (thereby causing address decoder 248 to de-assert the word line of the decoded address).

Performing a read operation in memory 24 may include performing a precharge operation as discussed above. The precharge operation may be performed when the clock/strobe signal ('Clk_mem') is low. When the clock signal transitions high and the read enable signal is asserted, address decoder 248 may assert a word line associated with a received address. When the word line is asserted, the memory cells 242 coupled thereto may become transparent to their correspondingly coupled bit lines. When a given memory cell 242 is transparent, its correspondingly coupled bit lines will eventually separate in voltage, with one of the bit lines remaining high and the other one of the bit lines falling low, depending upon the stored data. For example, if a given memory cell 242 in bit position 0 is storing a logic 1 as true data, it may (when its corresponding word line is asserted) cause its corresponding true bit line (e.g., BL0_H) to remain at a high voltage while its corresponding complementary bit line (e.g., BL0_L) to fall low. Conversely, if the cell is storing a logic 0 as true data, the true bit line may fall low, while the complementary bit line remains high.

The voltages on the bit lines of each column may be detected by sense amplifiers 246. Sense amplifiers 246 may be implemented in many different ways (e.g., with other logic gates, analog comparators, etc.). In the embodiment shown, sense amplifiers 246 may output the true data received via the bit lines coupled thereto. In this particular embodiment, each sense amplifier 246 includes an enable input that causes each sense amplifier 249 to sense a difference between the voltages on the BL_L and BL_H bit lines coupled thereto. The enable input in this embodiment is coupled to the Sense Amp Enable output of delay controller 249. Delaying the enable of sense amplifiers 249 may allow more time for the voltage difference of the bit lines to develop responsive to assertion of a word line. When the V_mem voltage is lower, more delay time may be allotted to allow the voltage difference to develop.

The amount of time in which assertion of the Sense Amp Enable signal is delayed during a read operation may be set by delay controller 249. Delay controller 249 may also set the delay for assertion of the word line enable signal during write operations. The delay settings may be received from power management unit 22 as shown in FIG. 1. These settings may be changed according to an operating point. When an operating point is changed from a lower operating voltage to a higher operating voltage, the delay time may be reduced. When an operating point is changed from a higher operating voltage to a lower operating voltage, the delay time may be increased.

Some embodiments may also include delay units coupled between the output pins of the memory and the outputs of each sense amplifier 246. In addition to controlling the amount of time in which assertion of the Sense Amp Enable signal is delayed, delay controller may also set the delay of such delay elements during read operations.

Figure 3:
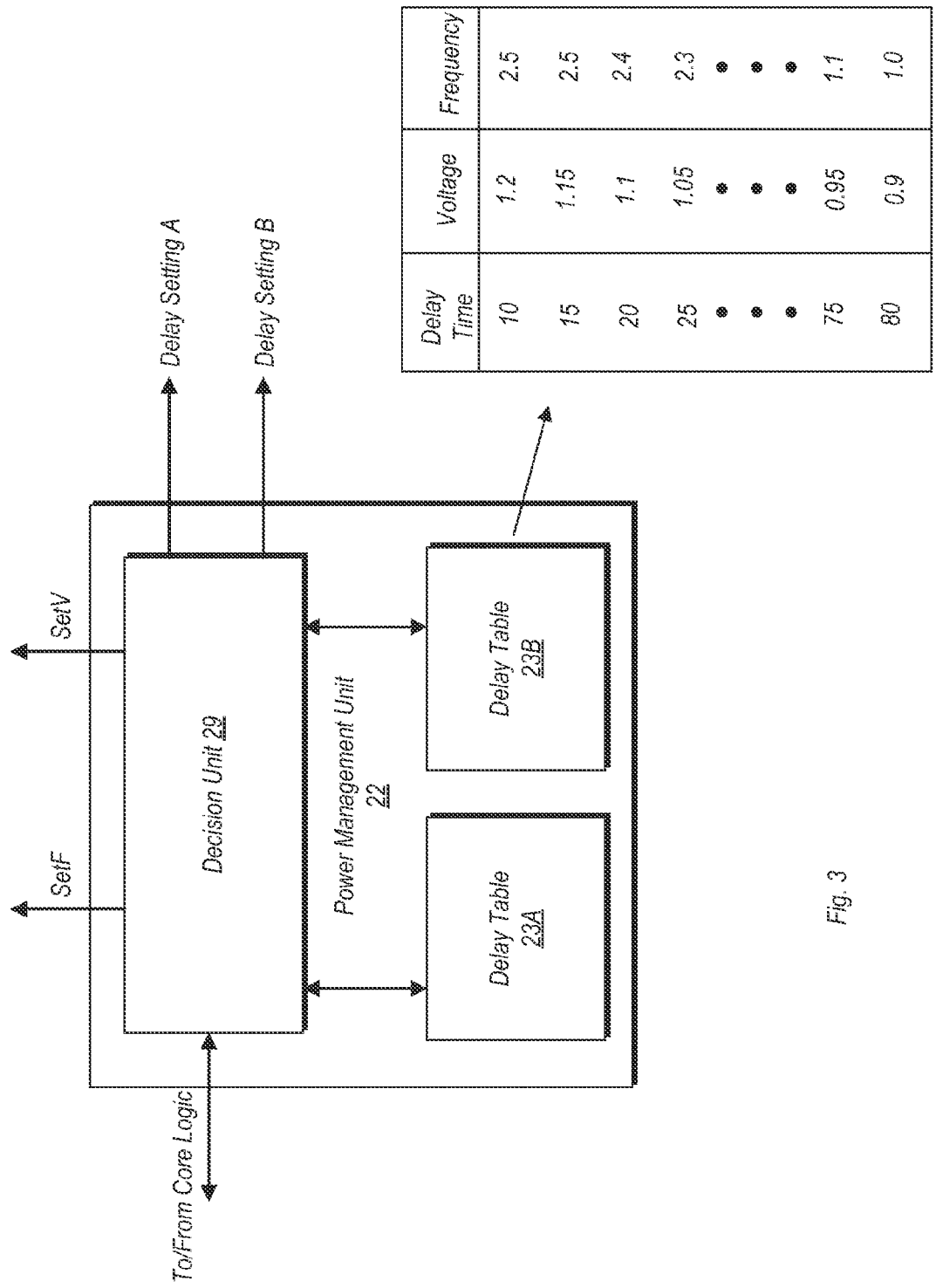
FIG. 3 is a block diagram of one embodiment of a control unit including a table storing delay values for each of a number of different operating points.

Power Management Unit:

FIG. 3 is a block diagram of one embodiment of a control unit including a table storing delay values for each of a number of different operating points. More particularly, FIG. 3 illustrates one embodiment of power management unit 22, which is configured to perform various power control and related functions, including the selection of delay settings for at least two different memories. For the sake of the discussion, power management unit 22 is discussed below in conjunction with the embodiment of IC 20 shown in FIG. 1.

In the embodiment shown, power management unit 22 includes a decision unit 29, a first EMA table 23A, and a second EMA table 23B. Decision unit 29 may communicate with core logic unit 21 to determine the appropriate operating point for the current conditions. In some embodiments, decision unit 29 may monitor activity levels in core logic unit 21 in order to determine the appropriate operating point. Activity monitoring may include monitoring activity such as instructions executed, instructions retired, memory accesses, input/output accesses, or any other activity that may place performance demands on core logic unit 21. The activity level may be monitored over successive time intervals. Based on the monitored activity level, decision unit 29 may determine that an operating point change is desirable, if not necessary. For example, if core logic unit 21 experiences a rapid increase in processing workload, decision unit 29 may respond by changing the operating point to one commensurate with higher performance. Conversely, if the processing workload falls, decision unit 29 may change the operating point to one more appropriate for reduced performance demand.

It is also noted that core logic unit 21 may be configured to send a request to change the operating point to decision unit 29. For example, upon completion of a task with no further tasks currently awaiting, core logic unit 21 may send a request to decision unit 29 to change the operating point to one that consumes less power. In other embodiments, software may also request a change of operating point (e.g., software instructions that are being executed in core logic unit 21).

Responsive to a decision to change the operating point, decision unit 29 may send signals to one or both of voltage regulator 25 and clock control unit 26. Control signals sent to voltage regulator 25 ('SetV') may be used to change the voltage provided to core logic unit 21 and/or memories 24A and 24B. A change of operating point may also include a changing of the frequency of respective clock signals provided to control logic unit 21 and/or memories 24A and 24B. Control signals ('SetF') may be sent to clock control unit 26 in order to cause a change to the respective frequencies of one or more of the clock signals.

As previously noted, a change to an operating point (and more particularly, a change of the operating voltage) may change the necessary timing margin required for memories 24A and 24B to provide valid data during a read operation, or to write valid data during a write operation. Power management unit 22 in the embodiment shown includes a first delay table 23A storing delay values for memory 24A, and a second delay table 23B storing delay values for memory 24B. An example illustrating delay time values for a number of different voltage/frequency operating points is shown for delay table 23B. In this exemplary table, a highest performance operating point includes an operating voltage of 1.2 Volts and a clock frequency of 2.5 GHz. The operating points are listed in this particular table in descending order (i.e. from a highest performance operating point to a lowest performance operating point). Generally, in traversing the table from a highest operating point to a lowest operating point, the voltage is reduced. Clock frequency may also be reduced for operating points traversing the table in descending order, although in some cases, the frequency remain the same while the operating voltage is reduced. For each operating point, a delay time is listed. The units of the delay time may be any suitable unit (e.g., nanosecond, microseconds, etc).

It is noted that delay tables 23A and 23B may in some cases store different delay time values for the same operating points. The differences in delay time values may reflect different operational or electrical characteristics of the various memories of IC 20. It is further noted that the data structure of the table shown here is exemplary, and is thus not intended to be limiting. It is further noted that for a given memory, power management unit 22 may include separate delay tables for read and write operations, as different delay times may be required. However, it is nevertheless possible that read and write operations for a given memory may use the same delay settings for a given supply voltage.

Various types of storage circuitry may be used to implement delay tables 23A and 23B. Various embodiments may implement delay tables 23A and 23B using static random access memory (SRAM), read only memory (ROM), programmable ROM (PROM), flash memory, or any other suitable memory technology.

Programming of delay tables 23A and 23B may be accomplished in various ways, depending on the specific embodiment. In some embodiments, delay tables 23A and 23B may be programmed prior to shipping IC 20 to a customer (e.g., during a manufacturing test). In another embodiment, IC 20 may be configured to perform a built-in self-test on system startup that includes determining appropriate delay values for the specified operating point, with the results being programmed into delay tables 23A and 23B. In yet another embodiment, delay tables 23A and 23B may be dynamically updated responsive to changing operating conditions (e.g., a change of temperature), wherein another BIST is conducted during operation to determine new delay time values for memories 24A and 24B and to update their corresponding delay tables.

Responsive to determining that an operating point change is to be made, decision unit 29 may access delay tables 23A and 23B to determine the respective delay values for the new operating point. More particularly, decision unit 29 may locate the new operating point on each table, and may select the delay time corresponding thereto. Decision unit 29 may then select the new delay time values from the tables and forward these values to their respective memories. Decision unit 29 may convey the selected delay time value from delay table 23A as Delay Setting A to memory 24A. Similarly, decision unit 29 may convey the selected delay time value from delay table 23B to as Delay Setting B to memory 24B. Memories 24A and 24B may respectively receive Delay Setting A and Delay Setting B and may thus set the delay times accordingly.

Using the data stored in delay tables 23A and 23B may allow for faster updates of the delay relative to embodiments in which no such tables are used. In comparison, some embodiments wherein the delay time is set by software, delay time adjustments may be at least an order of magnitude slower than the hardware-based methodology discussed herein.

The timing of setting the delays for memories 24A and 24B may depend on the direction of change of the operating point. In one embodiment, if the operating point is changed to a higher supply voltage, the change to the delay time may be performed after the supply voltage increase. Conversely, if the operating point is changed to a lower performance operating point, the change to the delay time may be performed before the operating point change. When both the supply voltage and the clock frequency are to be increased, the delay time may be changed after the change to the supply voltage but before the change to the clock frequency. If both the supply voltage and the clock frequency are to be decreased, the delay time changed after the clock frequency is changed but before the supply voltage is changed.

Furthermore, changes to the delay times of memories may be performed between cycles (either read or write). In the embodiment shown, decision unit 29 may convey a message to core logic unit 21 when it is preparing to send the delay settings to their respective memories. In response, core logic unit 21 may de-assert both read and write enables of the memories. After receiving acknowledgement that the memories are disabled for reading and writing, decision unit 29 may then convey the delay settings to the memories. In some embodiments, circuitry in the memories (e.g., see delay controller 249) may acknowledge the setting of new delay values to decision unit 29 and or core logic unit 21. In other embodiments, core logic unit 21 may wait a predetermined amount of time before attempting any new reads or writes of the memory. The predetermined time may be selected to allow sufficient time for memories 24A and 24B to change their respective delay settings.

Figure 4:
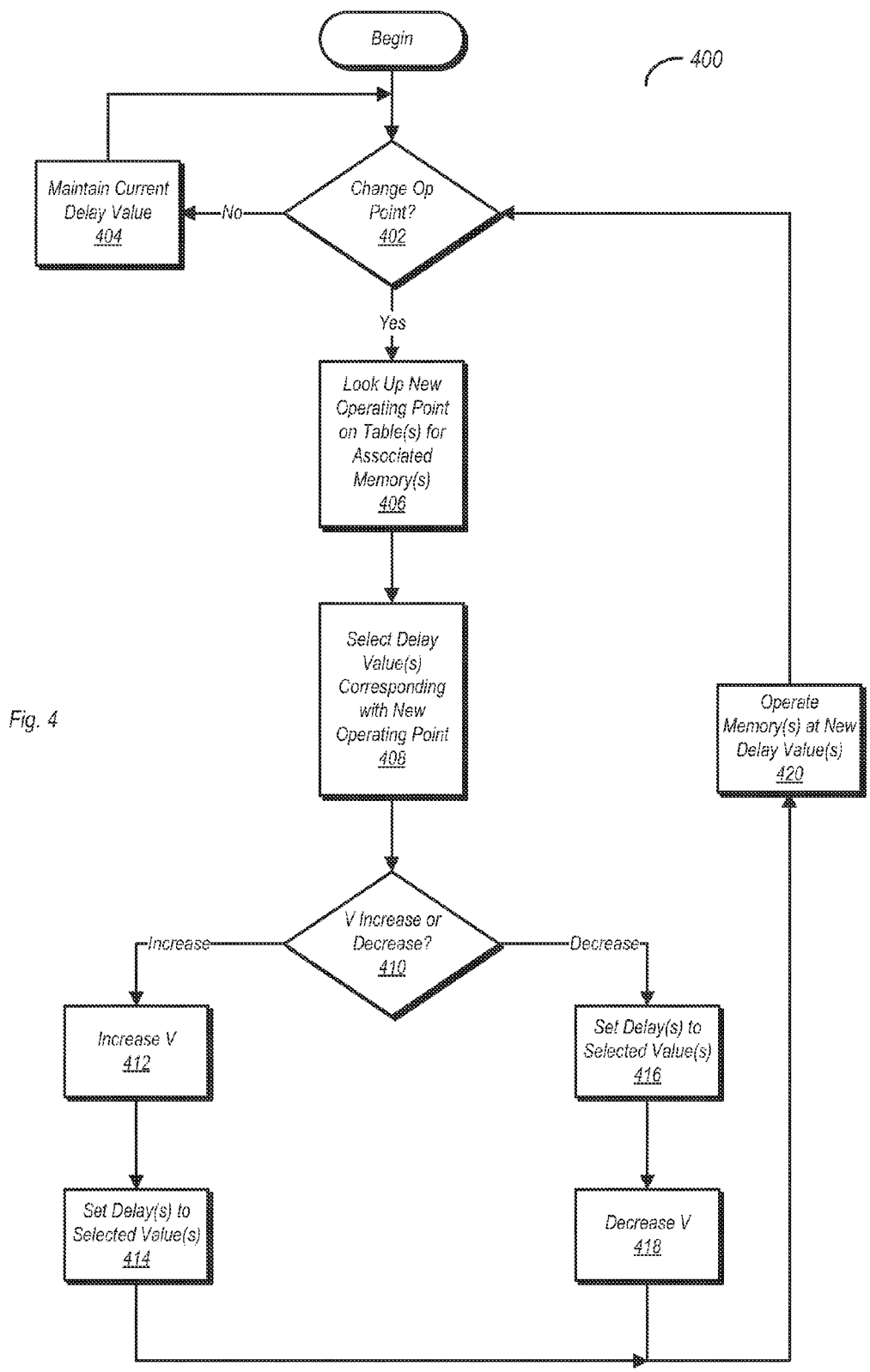
FIG. 4 is a flow diagram illustrating one embodiment of a method for changing the delay values associated with memory reads responsive to changes in an operating point.

Method Flow Diagram:

FIG. 4 is a flow diagram illustrating one embodiment of a method for changing the delay values associated with memory reads responsive to changes in an operating point. Method 400 may apply to various embodiments of IC 20 and its corresponding components as discussed above, and thus the discussion of FIG. 4 will make reference thereto. However, method 400 may further apply to other embodiments of an IC and/or electronic system not explicitly discussed herein.

Method 400 in the embodiment shown begins with a query regarding a current operating point. As noted above, an operating point may include an operating voltage and/or a frequency of a clock signal provided to a memory. Changes of the operating point may require changes to the delay time used to implement the read margin of the memory in order to ensure that valid data is provided during a read operation. If no operating point change is to be made (block 402, no), then the current delay time value is maintained (block 404).

If it is determined that an operating point change is to be made (block 402, yes), then a new delay time value for each memory of IC 20 may be determined. Determining new delay time values may be performed by looking up the new operating point in tables associated with each memory of IC 20 (block 406). After locating the new operating point in the table, the delay time values corresponding thereto for each memory may be selected (block 408).

In a first case, the change of operating point results in an increase in an operating voltage (block 410, increase). Accordingly, the operating voltage is increased (block 412) prior to setting the delays to the newly selected values (block 414). A clock frequency may be increased subsequent to setting the delays to the newly selected values if such an increase is part of the operating point change.

In a second case, the operating point change results in a decrease in the operating voltage (block 410, decrease). Accordingly, the delay time values are set to the selected values (block 416) prior to reducing the operating voltage. The clock frequency may be decreased prior to changing the delay time value if such a decrease is part of the operating point change.

Subsequent to the setting of the new delay time values, the memories of IC 20 may operate at the newly selected and set delay time values (block 420). The method then returns to block 402.

Figure 5:
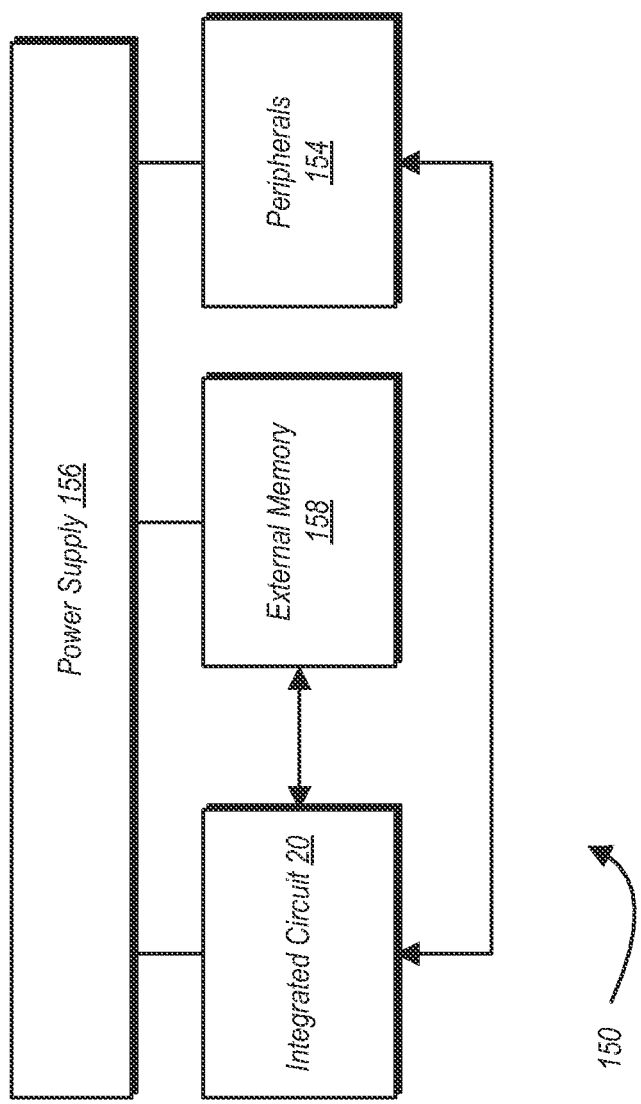
FIG. 5 is a block diagram of one embodiment of a system.

Exemplary System:

Turning next to FIG. 5, a block diagram of one embodiment of a system 150 is shown. In the illustrated embodiment, the system 150 includes at least one instance of an IC 20 (from FIG. 1) coupled to one or more peripherals 154 and an external memory 158. A power supply 156 is also provided which supplies the supply voltages to the IC 5 as well as one or more supply voltages to the memory 158 and/or the peripherals 154. In some embodiments, more than one instance of the IC 20 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
   a plurality of memory arrays; and
   a control unit coupled to the plurality of memory arrays, wherein the control unit includes a first table storing predefined delay values for a first one of the plurality of memory arrays, wherein each of the delay values is indicative of a delay time between the beginning of a read cycle and enabling of the first memory to provide valid data, wherein each delay value corresponds to a unique one of a plurality of predefined operating points;
   wherein responsive to an indication of a change of operation to a new operating point of the plurality of predefined operating points, the control unit is configured to access the first table to determine a first delay value based on a new value of the operating point and further configured to set the first delay value for the first memory array responsive to determining the first delay value;
   wherein the operating point includes a supply voltage used to power each of the plurality of memory arrays; and
   wherein the control unit further includes a second table storing delay values for each of the operating points for a second memory array, wherein responsive to an indication of a change of operation to a new value of the operating point, the control unit is configured to access the second table to determine a second delay value based on a new value of the operating point and further configured to set the second delay value for at least one of the second memory array responsive to determining the given delay value.

2. The integrated circuit as recited in claim 1, wherein changing the operating point comprises changing the supply voltage provided to the plurality of memory arrays, wherein the control unit is configured to increase the delay prior to a reduction in supply voltage provided to the one or more memory arrays, and wherein the control unit is further configured to reduce the delay subsequent to an increase in the supply voltage provided to the plurality of memory arrays.

3. The integrated circuit as recited in claim 1, wherein the second delay value is different from the first delay value.

4. The integrated circuit as recited in claim 2, wherein the operating point further comprises a clock frequency at which the plurality of memory arrays operate, and wherein changing the operating point additionally includes changing the clock frequency.

5. A method comprising:
   providing, to a control unit, an indication of a change of operation of an integrated circuit (IC) from a current operating point to a new operating point;
   responsive to the indication, the control unit accessing first and second tables respectively associated with first and second memories located on the IC, the first and second tables each storing a plurality of predefined delay values each corresponding to a unique one of a plurality of predefined operating points including the current operating point and the new operating point, wherein each of the delay values indicates a delay time between a start of a read cycle and a time when its respective memory is capable of outputting valid data, wherein each of the predefined operating points includes a supply voltage used to power the memory;
   the control unit selecting from each of the first and second tables respective delay values corresponding to the new operating point; and
   the control unit setting the first and second memories to operate at the selected respective delay values.

6. The method as recited in claim 5 further comprising the control unit setting the memory to operate at the selected delay value prior to changing the operating point responsive to a first condition, and the control unit setting the memory to operate at the selected delay value subsequent to changing the operating point responsive to a second condition.

7. The method as recited in claim 6, wherein the first condition includes a decrease in the supply voltage provided to the memory.

8. The method as recited in claim 7, wherein the second condition includes an increase in the supply voltage provided to the memory.

9. The method as recited in claim 5 further comprising selecting a first delay value from the first table and a second delay value from the second table, wherein the second delay value is different from the first delay value.

10. A method comprising:
    providing, to a power management unit, a request to operate a plurality of on-chip memories at a new value of a supply voltage, wherein the supply voltage is used to power the on-chip memories;
    the power management unit accessing a plurality of tables storing predefined delay values for each of a plurality of different supply voltages, each of the plurality of tables corresponding to a unique one of the plurality of memories, wherein each delay value indicates an amount of time required for sense amplifiers of the corresponding memory to provide valid data after assertion of word lines during a read cycle;
    the power management unit selecting delay values from each of the plurality of tables that correspond to the new value of the supply voltage; and the power management unit causing each of the plurality of memories to operate according to their respectively selected delay values.

11. The method as recited in claim 10, further comprising the power management unit causing the plurality of memories to operate according to their respectively selected delay values prior to a decrease of the supply voltage.

12. The method as recited in claim 11, further comprising the power management unit causing an increase in the delay values for the plurality of memories prior to a decrease of the supply voltage.

13. The method as recited in claim 10, further comprising the power management unit causing the plurality of memories to operate according to their respectively selected delay values subsequent to an increase in the supply voltage.

14. The method as recited in claim 13, further comprising the power management unit causing a reduction in the respectively selected delay values responsive to a decrease in the supply voltage.

15. An integrated circuit comprising:
a plurality of memory arrays each powered by a supply voltage; and
a power controller including a plurality of tables each storing a corresponding plurality of predefined delay times for a corresponding unique one of the plurality of memory arrays, wherein each of the delay times corresponds to one of a plurality of supply voltage values, wherein each of the delay times is indicative of a timing margin required for performing a memory access;
wherein the power controller is configured to access the plurality of tables responsive to receiving an indication of a change of the supply voltage to a new value, wherein accessing the plurality of tables includes, for each of the plurality of memory arrays, selecting a respective delay time corresponding to the new value of the supply voltage; and wherein the power controller is further configured to provide the selected delay times to the respective ones of the plurality of memory arrays in order to cause the memory arrays to operate according to their newly selected delay times.

16. The integrated circuit as recited in claim 15, wherein the power controller is further configured to determine if the new value of the supply voltage is greater than or less than a current value of the supply voltage.

17. The integrated circuit as recited in claim 16, wherein the power controller is further configured to provide the selected delay times to the respective ones of the plurality of memory arrays prior to the change of the supply voltage responsive to determining the new value of the supply voltage is less than the current value of the supply voltage, wherein one or more of the selected delay times is greater than a corresponding current delay time, and wherein the power controller is further configured to provide the selected delay times to the respective ones of the plurality of memory arrays subsequent to the change of the supply voltage responsive to determining the new value of the supply voltage is greater than the current value of the supply voltage, wherein one or more of the selected delay times is less than a corresponding current delay time.

18. The integrated circuit as recited in claim 16, wherein the memory access is a write access, and wherein a given delay time corresponds to a time between a plurality of write drivers driving data onto respective bit lines and a time when word lines corresponding to a target write address are asserted.

19. The integrated circuit as recited in claim 15, wherein the memory access is a read access, and wherein a given delay time corresponds to a time between assertion of a word line associated with a target read address and a time when sense amplifiers are enabled to provide valid data from the target read address.

* * * * *